United States Patent [19]

Rowinski

[11] 4,043,247
[45] Aug. 23, 1977

[54] WALL FASTENER

[75] Inventor: Anthony S. Rowinski, Bloomfield Hills, Mich.

[73] Assignee: U.S. Engineering Company, Inc., Muncie, Ind.

[21] Appl. No.: 636,060

[22] Filed: Nov. 28, 1975

[51] Int. Cl.² ............................................. F16B 15/00
[52] U.S. Cl. .......................................... 85/31; 85/23; 85/26
[58] Field of Search .................. 85/31, 23, 26, 30

[56] References Cited

U.S. PATENT DOCUMENTS

| 1,121,076 | 12/1914 | Dillon | 85/26 |
| 1,548,456 | 8/1925 | Goodman | 85/23 |
| 3,177,753 | 4/1965 | Maginnis | 85/31 X |
| 3,188,904 | 6/1965 | Owen | 85/23 |
| 3,396,624 | 8/1968 | Eriksson et al. | 85/23 X |
| 3,455,200 | 7/1969 | Cumming | 85/26 X |
| 3,519,704 | 7/1970 | Maginnis | 85/31 X |

FOREIGN PATENT DOCUMENTS

| 530,942 | 1/1922 | France | 85/26 |
| 915,366 | 11/1946 | France | 85/23 |

Primary Examiner—Roy D. Frazier
Assistant Examiner—Rodney H. Bonck
Attorney, Agent, or Firm—Arnold S. Weintraub

[57] ABSTRACT

An anchor for facilitating the suspending of articles from walls or ceilings includes a tubular fastener-receiving member which penetrates the wall. The tubular member has an arcuate free end which causes a fastener, such as a nail inserted therethrough to curl out of and back into the wall. The anchor is particularly useful in suspending articles from dry wall and the like.

6 Claims, 9 Drawing Figures

WALL FASTENER

BACKGROUND OF THE INVENTION

1. Field of the Invention

The present invention pertains to anchoring devices. More particularly, the present invention pertains to anchors for suspending or securing articles from or to walls. Even more particularly, the present invention pertains to anchors particularly adapted for suspending or securing articles to drywall, wall board and other compressed materials.

2. Prior Art

Modern day construction has seen the dissipation of the use of plaster as a material of construction for walls, ceilings and the like. Rather, present installations dictate the use of drywall, wall board, and other compressed articles as walls and ceilings. While such materials provide rapid construction and ease of use, other problems arise. For example, in order to lend aesthetic and functional appeal to walls and ceilings, it is necessary to hang or suspend articles therefrom, such as lighting fixtures, shelving, paintings, drapery rods, plants, telephones and the like. In order to accomplish this, other than by direct attachment to joists and beams, three modes are presently used. First, plastic anchors are emplaced in the wall, by first drilling an opening through the wall and then inserting the anchor thereinto. A threaded fastener is then used to secure the suspended article to the wall. However, plastic anchors, oftentimes, become loose in the wall thereby weakening the securement. Another device presently used is a toggle bolt. However, the use of a toggle bolt necessitates the drilling of a large hole through the wall in order to insert the toggle past the wall. Furthermore, if the article suspended from the toggle is sought to be moved, then the toggle is lost and a large opening is left in the wall. The other device most commonly used is a "molle" bolt, which is an expansion type bolt. This bolt cannot be removed from the wall. It must be driven through the wall, thus, leaving a large opening. It is to be appreciated that these devices each suffer from drawbacks, either as a result of the use of the compressed materials used for walls or as a result of their own design. Thus, a major advance would be provided by a wall fastener which overcomes the problems alluded to above. It should be noted in this regard that the prior art has appreciated these problems and sought solutions thereto. See, inter alia, U.S. Pat. Nos. 1,272,696; 3,177,753; 3,519,704 and 338,059. Yet, such devices are either difficult to utilize or otherwise not fully functional. The present invention, on the other hand, provides a device which is easy to employ and which overcomes all the problems attendant the prior art.

SUMMARY OF THE INVENTION

In accordance with the present invention, there is provided an anchor for facilitating securement or suspension of an article from a wall or ceiling. The anchor hereof comprises a driving surface for embedding the anchor in the wall and a tubular element extending outwardly from the driving surface. The free end of the tubular member is arcuate or curved. A fastener, such as a nail, is insertable through the driving surface into the tubular element. Because of the arcuate end of the tubular member, any fastener driven therethrough is caused to curve, and as such, will exit out of the wall and curl back into the wall. Thus, the fastening effected hereby is secure and as strong as the wall, per se.

In accordance herewith, the anchor hereof is incorporated into a J-shaped picture hanger. Another embodiment hereof contemplates a portion of the anchor having threaded profile. A still further embodiment hereof includes a "double-headed" anchor. The latter two embodiments have complementary fasteners associated therewith.

For a more complete understanding of the present invention, reference is made to the following detailed description and accompanying drawing. In the drawing like reference characters refer to like parts throughout the several views, in which:

DETAILED DESCRIPTION OF THE PREFERRED EMBODIMENT

Figure 1:
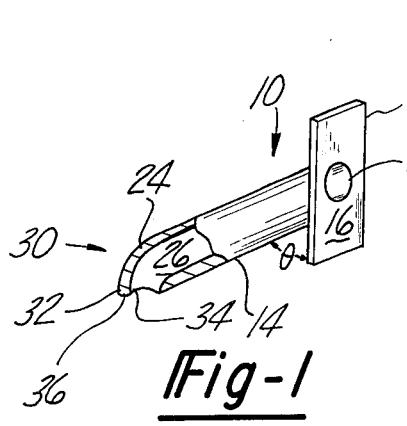
FIG. 1 is a perspective view, partly in cross-section, of a first embodiment of the present invention.
Figure 2:
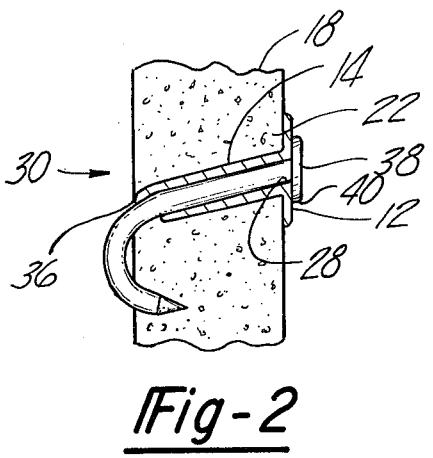
FIG. 2 is a cross-sectional view showing the deployment of the anchor of FIG. 1.

Now, with reference to the drawing, and in particular, FIGS. 1 and 2, there is depicted therein a first embodiment of the anchor of the present invention, which is, generally, indicated at 10. The anchor 10, generally, comprises a driving area or surface 12 and a tubular element 14. The tubular element 14 extends outwardly from the driving surface. The tubular element 14, as will subsequently be detailed, is inclined with respect to the driving head 12 by an angle. The angle can vary from between about 70° to about 90°.

With more particularity, the driving surface 12 is defined by a substantially flat member having any desired configuration. The driving head 12 serves a twofold function. Initially, the head 12 provides a surface 16 which can be tapped to drive the anchor 10 into a wall 18. Secondly, the head functions as a stop to limit the amount by which the anchor can be driven into the wall. The head 12 is provided with a central aperture 20. The aperture 20 is in registry with the interior of the tubular element 14. The tubular element 14 extends from the back surface 22 of the head 12 and outwardly therefrom. The tubular element 14 is a thin-walled member 24 having a central interior passageway 26. The entrance or inlet 28 of the passageway adjacent the driving head is contiguous to and in registry with the aperture 20 to define a continuous passageway.

As clearly shown in FIGS. 1 and 2, and of utmost criticality to the present anchor 10, the free or terminal end 30 of the tubular element 14 is provided with a curvilinear or arcuate section 32. Th arcuate section 32 has a radius of curvature ranging from about 40° to about 50° and is, preferably, about 45°. By so arcing the tubular element 14, the exit 34 from the passageway 26 is rendered substantially perpendicular to the entrance 28. Also, the terminus 36 of the arcuate section 32 defines a driving point for driving the anchor 10 into the wall 18.

Referring specifically now to FIG. 2, there is depicted therein the deployment of the anchor 10. In accordance herewith, the anchor 10 is inserted into the wall 18 by any suitable mode. Because of the provision of the driving point 36, the anchor can be hammered or otherwise driven into the wall. Furthermore, because of the angular relationship between the tubular element 14 and the driving head 12, the anchor is embedded in the wall at an angle deviating from the perpendicular, thereby providing a more secure placement in the wall. Also, it should be noted, and as shown, the back surface 22 of the head 12 limits the amount of insertion of the anchor in the wall, since the back surface 22 abuts the wall 18. It should also be noted that the anchor can be inserted into the wall by first drilling a hole therethrough and then inserting the anchor into the so-drilled hole.

After the anchor is emplaced in the wall, a fastener, such as a nail 38, is then inserted through the aperture 20 and into the passageway 26. By pounding the nail through the passageway, the nail is forced to arc in conformity to the arcuate portion of the tubular element. This arcing of the nail or fastener 38 causes the leading portion of the fastener to pass through exit 34 and to curl back upon itself and re-insert into the back of the wall. Thus, the securement is rendered as strong as the wall, per se, and will not loosen from the wall. Thus, articles such as picture wire, can be suspended by placing the wire on the nail between a space defined between the fastener head 40 and the driving head 12 without any possible hazard.

Figure 3:
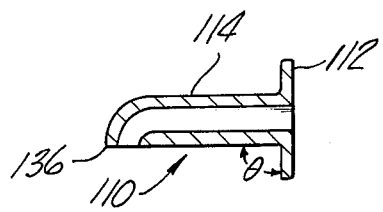
FIG. 3 is a cross-sectional view of a second embodiment of the present invention.
Figure 4:
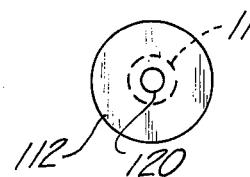
FIG. 4 is an end view of the embodiment of FIG. 3.

Referring now to FIGS. 3 and 4, there is depicted an alternate embodiment of the anchor and which is generally indicated at 110. In accordance herewith the angle is substantially 90°. In other words, the tubular element 114 is substantially perpendicular to the driving head 112. In all other respects the anchor is the same as described with respect to the embodiment of FIGS. 1 and 2. It has been found in accordance herewith that if the anchor is pounded into the wall, then the momentum transferred to the driving point 136 from the driving head 112 will cause the anchor to enter into the wall at angle deviating from the perpendicular with respect thereto. Thus, the angular emplacement of the anchor in the wall can still be achieved without the need for angulating the tubular element with respect to the driving head.

Thus, in considering the embodiment of FIGS. 1-4 hereof, the tubular element 14 or 114 is disposed, with respect to the driving head 12 or 112, at an angle. Thus, the angle ranges from about 70° to about 90°.

Figure 5:
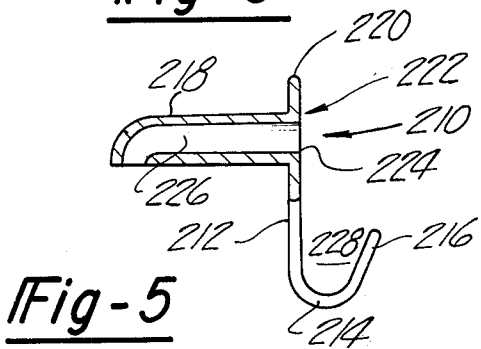
FIG. 5 is a cross-sectional view depicting the incorporation of the present anchor into a picture hanging hook.
Figure 6:
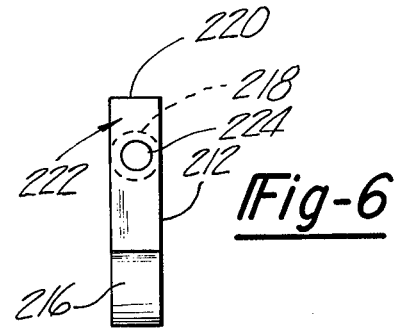
FIG. 6 is an end view of the hook of FIG. 5.

Referring now to FIGS. 5 and 6, there is depicted a further embodiment of the present invention, and which is generally indicated at 210. The anchor 210 contemplates a J-shaped member which comprises an elongated leg 212, an arcuate leg 214 integrally formed with the leg 212 and a short leg 216 integral with the arcuate leg 214. The three legs cooperate to define the J-shaped member.

As shown in FIG. 5 extending outwardly from and substantially perpendicular to the leg 212 is a tubular element 218. The tubular element 218 is constructed analogously to the tubular elements 14 and 114 heretofore described. The element 218 is disposed proximate the upper or free end 220 of the leg 212. The surface of the leg 212 surrounding the tubular element 218 defines a driving area or surface 222. An aperture 224 formed in the leg 212 registers with the entrance of the passageway 226 formed in the tubular element 218. The anchor and hook combination of this embodiment is deployed in the manner heretofore described. The tubular element is driven into the wall and a fastener (not shown) is then driven through the passageway to secure the anchor and hook to the wall. The J-shaped hook can then accomodate a picture wire or the like by disposing the wire (not shown) in the space 228 between the legs 212 and 216. The wire will, then, rest on the arcuate leg 214 in the well-known manner.

Figure 7:
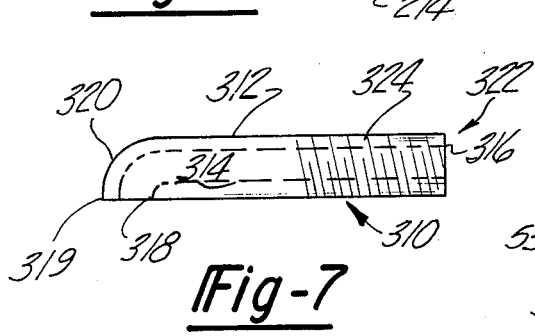
FIG. 7 is a side elevational view, partly in phantom, of another embodiment of the present invention.

Referring now to FIG. 7 there is depicted there in a further embodiment of the present anchor and which is generally denoted at 310. In accordance herewith, the anchor comprises an elongated tubural element 312 having an internal central passageway 314. The passageway includes an inlet or entrance 316 and an exit or outlet 318. The element 312 has one end thereof, proximate the outlet 318, provided with a curvilinear portion 320 such that the exit is substantially perpendicular to the entrance and a driving point 319 is provided, in the manner heretofore defined. The opposite end of the element, surrounding the inlet 316 defines the driving area or surface 322. In accordance with this embodiment the outer periphery of the tubular element 312 proximate the inlet 316 is provided with a helical threaded profile 324. By providing the exterior threaded profile, the tubular element can receive an internally threaded hook, connecter or the like (not shown). In utilizing this embodiment, the element is driven into the wall such that the threaded portion or shank protrudes outwardly therefrom. After the nail or other fastener (not shown) is driven through the passageway, an internally threaded hook can then be threadably connected to the threaded shank portion of the element protruding from the wall. It should be noted with respect hereto that a nut or similar threaded member (not shown) can be threadably mounted on the tubular element prior the driving it into the wall. Alternatively, a flange or similar stop (not shown) can be disposed about the periphery of the tubular element to limit penetration. The threaded member will then function as a stop or limit member to regulate the degree of penetration of the element. This embodiment of the invention is eminently useful for suspending hanging flower pots, swag lamps and the like from ceiling and walls.

Figure 8:
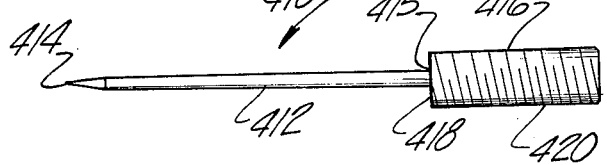
FIG. 8 is an elevational view of a fastener utilized with the anchor of FIG. 4.

Referring to FIG. 8, there is depicted therein a fastener 410 which is particularly adapted for use with the anchor of FIG. 7. The fastener 410 comprises an elongated portion 412 which terminates at a point 414 at one end thereof. The other end 415 of the elongated portion 412 is integral with an enlarged section or shank 416. The junction of the end 415 with the enlarged section 416 defines a shoulder 418. As shown in the drawing, the outer periphery of the shank 416 is externally threaded, as at 420. In utilizing the fastener 410 in conjunction with the anchor of FIG. 7, the diameter of the shank 416 is made equal to the diameter of the tubular element 312. Furthermore, the threaded profile 420 is the same as the threaded profile 324. In utilizing this fastener, after the anchor 310 is driven into a wall, the fastener is, then, driven through the passageway 314. The elongated section 412 is of a predetermined length such that it can curl back upon itself, while concommitantly the shoulder 418 will abut the surface 322 of the tubular element. Thus, the enlarged section 416 of the fastener 410 cooperates with the threaded portion of the tubular element.

It should be noted that the elongated section 412 has a taper from the end 415 to the point 414 to facilitate the driving thereof through the passageway of the tubular element. It should, also, be noted that the fastener 410 is not restricted to use solely with the anchor embodiment of FIG. 7. Rather it can be used with any of the anchors hereof where a threaded surface is required of the fastener.

Figure 9:
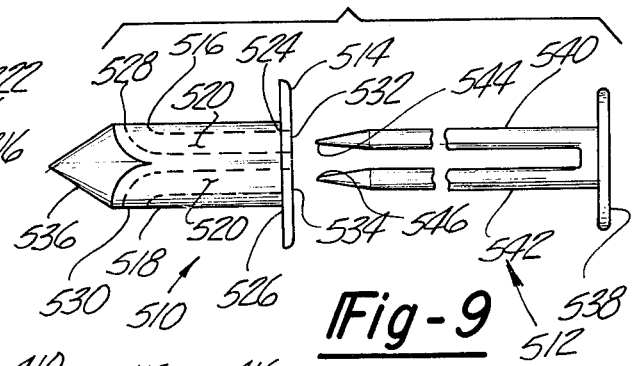
FIG. 9 is an elevational view of a further anchor and fastener in accordance with the present invention.

Referring now to FIG. 9, there is depicted a further embodiment of the present anchor which is, generally, denoted at 510 and a fastener therefor, generally, depicted at 512. The anchor 510, generally, comprises a head 514 and a pair of tubular elements 516, 518, respectively, extending outwardly therefrom. The pair of elements 516, 518 are joined together by any suitable mode such as by welding or the like. Each element 516, 518 has an internal passageway 520, 520 including an inlet 524, 526, respectively, and an exit 528, 530, respectively. The configurations of the tubular elements 516, 518 are the same as heretofore described.

The inlets 524, 526 are in registry with apertures 532, 534, respectively, formed in the head 514.

In accordance with this embodiment the exit 530 opens in a first direction and the exit 528 opens in a opposite direction. Commencing at the terminus of the tangent line of the two elements and radiating outwardly therefrom is a pyramid point 536. The point 536 is integrally formed with the anchor or otherwise secured thereto.

The point 536 permits the anchor to be driven into a wall or ceiling by hammering or otherwise pounding on the head 514.

As shown in FIG. 9, there is provided a fastener 512 for use with the anchor 510. The fastener comprises a driving head 538 and a pair of legs 540, 542 depending therefrom. The legs are substantially parallel to each other and are co-terminus. As shown, the legs are substantially perpendicular to the head. Each leg 540, 542 has its free end terminating in a point 544, 546, respectively. The legs are spaced apart a predetermined distance equal to the distance between the two passageways 520, 520. In utilizing this fastener, the legs are inserted into their respective passageways and are then driven therethrough such as with a hammer or the like. Because of the opposed arcuate nature of the passageways, one leg will curl out of a passageway and back into the wall or ceiling in a first direction and the other leg will similarly respond, but in the opposite direction.

It should be noted with respect to the present invention that each anchor can be formed as an integral structure, such as by stamping or the like. The anchors can be formed from any suitable material such as a rigid plastic, steel or the like. Furthermore, the passageways formed in the anchors are dimensioned to receive standard fasteners such as 17 gauge nails. The threaded profiles, where used can, also, be standardized, such as an 8/32 thread.

As hereinbefore noted the anchor hereof is ideally suited for facilitating the suspending of articles from drywall, wallboard, hollow doors and the like.

Having, thus, described the invention what is claimed is:

1. An anchor, comprising:
   a. a driving surface,
   b. a tubular element having an inlet and an outlet, the tubular element extending outwardly from the driving surface, the free end of the tubular element having an arcuate section such that the outlet is substantially perpendicular to the inlet, and
   c. means to cause the angular deviation of the tubular element from the perpendicular upon the driving of the tubular element into a wall, the means comprising the terminal point of the arcuate section.

2. The anchor of claim 1, which further comprises:
   a driving head integrally formed with the tubular element, the driving head defining the driving surface, the driving head having an aperture in registry with the inlet of the tubular element.

3. The anchor of claim 2 wherein:
   the tubular element extends from the driving head at angle with respect thereto, the angle ranging from about 70° to about 90°.

4. The anchor of claim 1, wherein:
   the outer periphery of the tubular element proximate the inlet is provided with a threaded profile.

5. A fastener for use with the anchor of claim 4, comprising:
   a. an elongated section, one end thereof terminating at a point,
   b. an enlarged shank integrally formed with the elongated section at the other end thereof, the exterior of the shank having a threaded profile the same as that of the tubular element.

6. A hook, comprising:
   a. an elongated first leg,
   b. an arcuate second leg integrally formed with the first leg at one end of the first leg,
   c. a third leg integrally formed with the arcuate leg at the other end of the arcuate leg,
   d. the first leg having an aperture formed therethrough proximate the free end thereof,
   e. the anchor of claim 1 extending outwardly from the first leg, the inlet of the tubular element communicating with the aperture of the first leg, and
   wherein the area of the first leg surrounding the aperture defines the driving surface.

* * * * *